United States Patent
Kamiyama et al.

(10) Patent No.: US 10,379,571 B2
(45) Date of Patent: Aug. 13, 2019

(54) TIMING DEVICE, ELECTRONIC APPARATUS, AND MOVING OBJECT

(71) Applicant: Seiko Epson Corporation, Tokyo (JP)

(72) Inventors: Masayuki Kamiyama, Chino (JP); Tsuyoshi Yoneyama, Chino (JP); Toru Shirotori, Minamiminowa (JP)

(73) Assignee: Seiko Epson Corporation (JP)

( * ) Notice: Subject to any disclaimer, the term of this patent is extended or adjusted under 35 U.S.C. 154(b) by 361 days.

(21) Appl. No.: 15/355,504

(22) Filed: Nov. 18, 2016

(65) Prior Publication Data

US 2017/0153661 A1 Jun. 1, 2017

(30) Foreign Application Priority Data

Nov. 30, 2015 (JP) .................. 2015-232819

(51) Int. Cl.
*G06F 1/12* (2006.01)

(52) U.S. Cl.
CPC ........ *G06F 1/12* (2013.01); *G06F 2221/2151* (2013.01)

(58) Field of Classification Search
CPC ...................................................... G06F 1/12
USPC ..... 377/19, 20, 64, 33, 47, 56, 75, 107, 114, 377/118, 130
See application file for complete search history.

(56) References Cited

U.S. PATENT DOCUMENTS

| 5,420,904 | A | * | 5/1995 | Gulick | ............... | H04L 1/205 |
| | | | | | | 327/31 |
| 5,805,532 | A | * | 9/1998 | Murakami | ............. | G04F 10/04 |
| | | | | | | 368/113 |
| 5,835,552 | A | * | 11/1998 | Kusumoto | .......... | G01R 29/027 |
| | | | | | | 377/24 |
| 5,982,841 | A | * | 11/1999 | Terada | ............... | G01R 29/027 |
| | | | | | | 377/20 |
| 6,275,558 | B1 | * | 8/2001 | Ichihara | ............. | H04J 13/0025 |
| | | | | | | 377/64 |
| 6,449,328 | B1 | * | 9/2002 | Hanna | .................... | G11C 19/00 |
| | | | | | | 377/64 |
| 7,123,679 | B2 | * | 10/2006 | Joo | ........................ | H03K 23/58 |
| | | | | | | 377/106 |
| 2010/0303195 | A1 | * | 12/2010 | Wang | ................... | G09G 3/3674 |
| | | | | | | 377/64 |
| 2011/0074968 | A1 | * | 3/2011 | Kim | ........................ | H03K 23/58 |
| | | | | | | 348/222.1 |
| 2012/0110364 | A1 | * | 5/2012 | Bhargava | .................. | G06F 1/12 |
| | | | | | | 713/400 |
| 2013/0142299 | A1 | * | 6/2013 | Takemura | ................ | G04F 10/00 |
| | | | | | | 377/19 |

(Continued)

OTHER PUBLICATIONS

Data Sheet for DS1390-DS1394 Low-Voltage SPI/3-Wire RTCs with Trickle Charger, Maxim Integrated Products, Inc., San Jose, California, pp. 1-26 (2012).

*Primary Examiner* — Tomi Skibinski

(74) *Attorney, Agent, or Firm* — Harness, Dickey & Pierce, P.L.C.

(57) ABSTRACT

A timing device includes a counter that performs counting action in synchronization with pulses in a clock signal to generate a 6-bit count value representing decimal numbers "0" to "39" in each count cycle in order to perform counting action on a 1/100-second basis and an output control circuit that outputs upper 4 bits of the count value generated by the counter as 4-bit timed data representing time on a 1/1000-second basis.

20 Claims, 6 Drawing Sheets

(56) References Cited

U.S. PATENT DOCUMENTS

2013/0142300 A1\* 6/2013 Takemura ............... G04F 1/005
                                                                        377/20
2018/0356855 A1\* 12/2018 Kamiyama ............... G06F 1/14

\* cited by examiner

TIMING DEVICE, ELECTRONIC APPARATUS, AND MOVING OBJECT

BACKGROUND

1. Technical Field

The present invention relates to a timing device that performs timing action in synchronization with a clock signal to generate timed data. The present invention further relates to an electronic apparatus, a moving object, and other apparatus using the timing device.

2. Related Art

A timing device used in a stopwatch or any other timepiece has the function of performing timing action on a $1/100$-second basis. For example, repeating a 41-count cycle by 96 times and a 40-count cycle by 4 times in synchronization with a clock signal of 4096 Hz amounts to 100 count cycles in total, during which 1 second elapses, as described in the data sheet of Low-Voltage SPI/3-Wire RTCs with Trickle Charger (MAXIM INTEGRATED, on page 15). Therefore, each of the 41-count periods or the 40-count periods contains an error to some extent but accurately corresponds to the period of $1/100$ seconds in the long run.

Direct application of the timing method described above to timing action on a $1/1000$-second basis, however, requires a clock signal having a frequency higher than 4096 Hz or requires a complicated circuit configuration due to a complicated counting condition and further increases consumed current.

SUMMARY

A first advantage of some aspects of the invention is to provide a timing device capable of performing timing action on a $1/1000$-second basis in a simple circuit configuration with almost no increase in consumed current. A second advantage of some aspects of the invention is to increase the accuracy of time stamp data representing the time when an event is detected. A third advantage of some aspects of the invention is to provide an electronic apparatus, a moving object, and other apparatus using the timing device.

A timing device according to a first aspect of the invention includes a counter that performs counting action in synchronization with pulses in a clock signal to generate a 6-bit count value representing decimal numbers "0" to "39" in each count cycle in order to perform counting action on a $1/100$-second basis and an output control circuit that outputs upper 4 bits of the count value generated by the counter as 4-bit timed data representing time on a $1/1000$-second basis.

According to the first aspect of the invention, shifting the upper 4 bits "0000" to "1001" of a 6-bit count value ranging from "000000" to "100111" generated to perform timing action on a $1/100$ second basis toward the lower levels by 2 bits allows generation of 4-bit timed data representing decimal numbers "0" to "9" as the time on a $1/1000$-second basis in a simple circuit configuration with almost no increase in consumed current.

The timing device may further includes a count control circuit that acts when the count value generated by the counter is equal to a value representing a decimal number "39" and sets one of (i) a first state transition in which the count value is maintained even when a next pulse in the clock signal arrives and the count value is reset to "0" in synchronization with a next pulse but one in the clock signal and (ii) a second state transition in which the count value is reset to "0" in synchronization with the next pulse in the clock signal. As a result, the period of a count cycle can be adjusted with the count values generated by the counter maintained smaller than or equal to "100111".

The clock signal may have a frequency of $2^{12}$ Hz, and the count control circuit may set the first state transition 96 times and sets the second state transition 4 times in consecutive 100 count cycles and output a carry signal when each of the count cycles ends. As a result, the carry signal outputted from the count control circuit can be used in the timing action on a $1/100$-second basis.

The timing device described above may further include a second counter that performs counting action in synchronization with the carry signal outputted from the count control circuit to generate a count value representing time on a $1/100$-second basis and outputs a second carry signal when the count value transitions to "0" and a plurality of high-order counters that perform counting action in synchronization with the second carry signal to generate a plurality of count values each representing time longer than or equal to a second.

In this case, the cycles of the counting action performed by the counter and the second counter always match the cycles of the counting action performed by the high-order counter. Therefore, when the time on a second basis transitions to "0", the time on a $1/100$-second basis and the time on a $1/1000$-second basis also transition to "0", whereby the timing of the counting action performed by the counter and the second counter does not need to be arbitrated with the timing of the counting action performed by the high-order counter.

Alternatively, the timing device may further includes a second counter that performs counting action in synchronization with the carry signal outputted from the count control circuit to generate a count value representing time on a $1/100$-second basis, a divider circuit that divides the clock signal to generate a divided clock a signal, a plurality of high-order counters that perform counting action in synchronization with the divided clock signal to generate a plurality of count values each representing time longer than or equal to a second, and an arbitration circuit that resets the counter and the second counter in synchronization with the divided clock signal.

In this case, since the circuit configuration for generating the divided clock signal to generate a plurality of count values each representing time longer than or equal to the second is as simple as the configuration of a timing device of related art that performs timing action on a second basis and on a longer time unit basis, the compatibility in terms of circuit layout and other factors with a timing device of related art can be enhanced.

The timing device may further include a time stamp circuit that stores at least timed data representing time on a $1/1000$-second basis in a timed data storage in response to an event detection signal. As a result, the timing device can record event detection time on a $1/1000$-second basis.

An electronic apparatus according to a second aspect of the invention includes any of the timing devices described above. A moving object according to a third aspect of the invention includes any of the timing devices described above. According to the second or third aspect of the invention, an electronic apparatus or a moving object capable of displaying time on a $1/1000$-second basis or recording event detection time on a $1/1000$ second basis can be provided by using the timing device that generates timed data representing time on a $1/1000$-second basis in a simple circuit configuration with almost no increase in consumed current.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
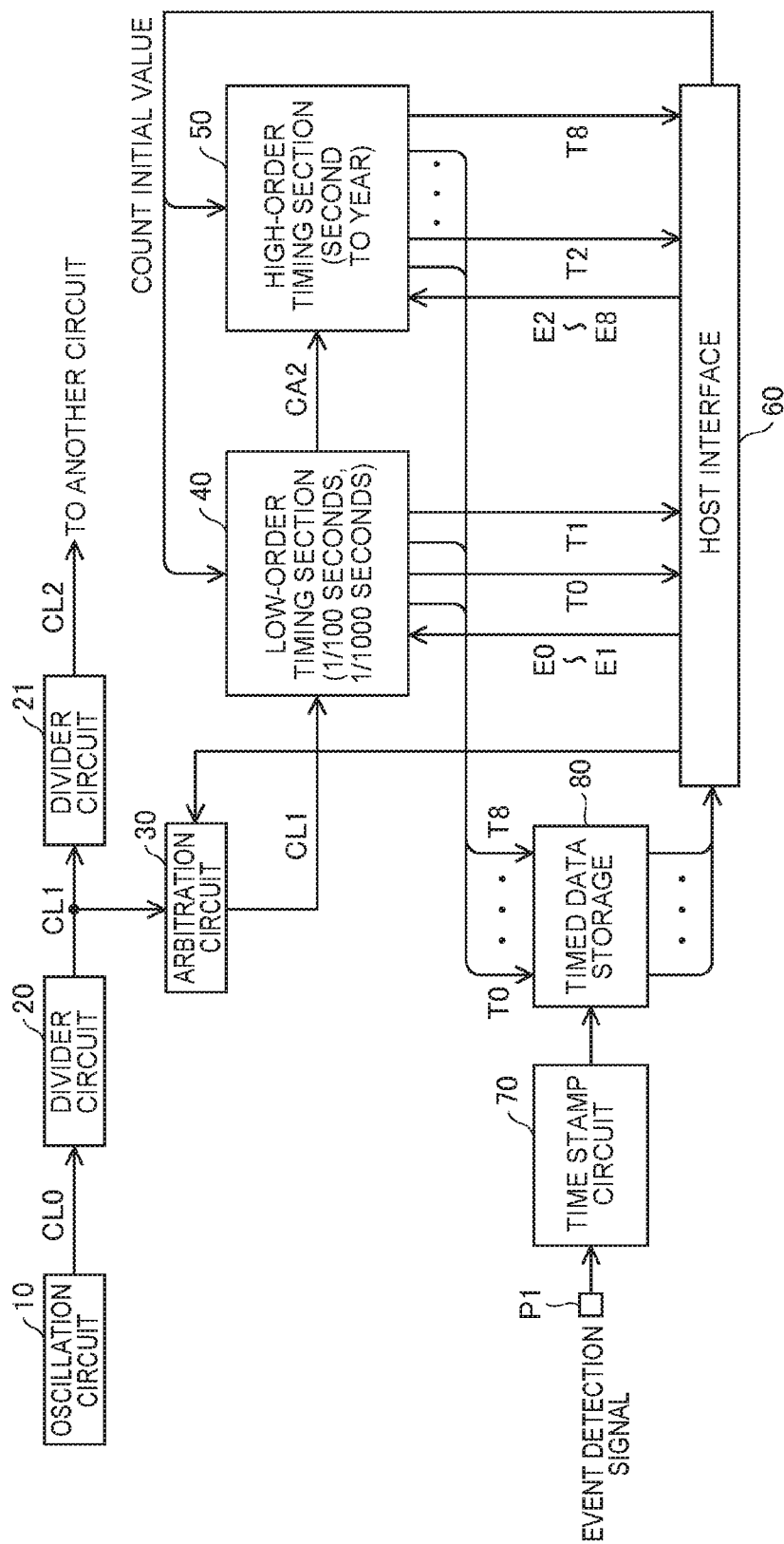
FIG. 1 is a block diagram showing an example of the configuration of a timing device according to a first embodiment of the invention.

Embodiments of the invention will be described below in detail with reference to the drawings. The same components have the same reference characters, and no redundant description will be made.

First Embodiment

FIG. 1 is a block diagram showing an example of the configuration of a timing device according to a first embodiment of the invention. The timing device has the function of a real-time clock (RTC) that performs timing action in synchronization with a clock signal to generate timed data.

The timing device includes an oscillation circuit 10, divider circuits 20 and 21, an arbitration circuit 30, a low-order timing section 40, a high-order timing section 50, and a host interface 60 and may further include a time stamp circuit 70 and a timed data storage 80, as shown in FIG. 1. Key portions of the timing device may be built in a semiconductor device (IC).

The oscillation circuit 10 performs oscillation action to generate an oscillation-source clock signal CL0, for example, having a frequency of 32768 Hz ($2^{15}$ Hz). The generation of the oscillation-source clock signal CL0 having a frequency of a power of 2 also allows division of the oscillation-source clock signal CL0 to generate a divided clock signal of 1 Hz, as will be described later. The oscillation circuit 10 is, for example, a quartz crystal oscillation circuit using a quartz crystal vibrator.

Figure 2:
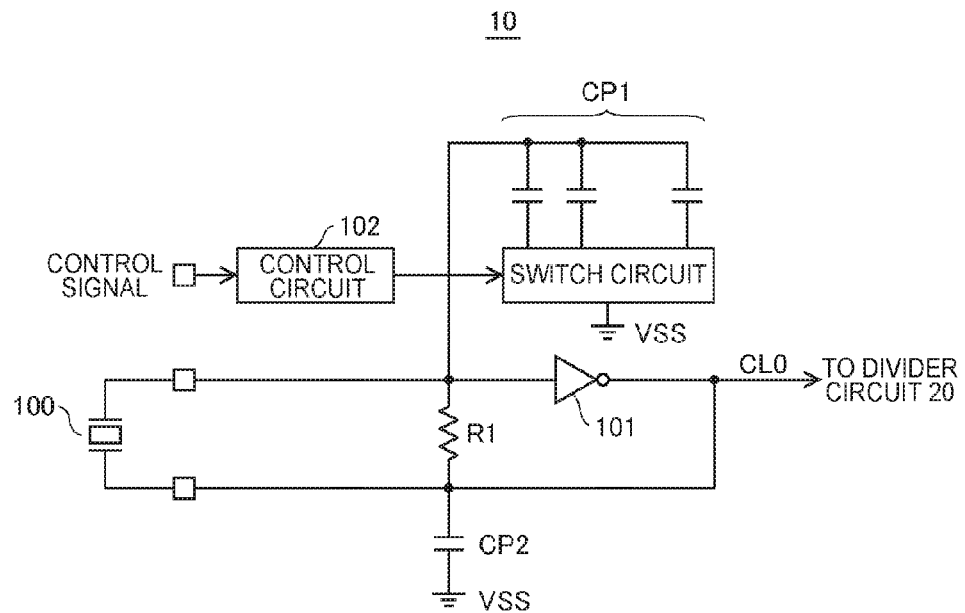
FIG. 2 is a circuit diagram showing an example of the configuration of an oscillation circuit shown in FIG. 1.

FIG. 2 is a circuit diagram showing an example of the configuration of the oscillation circuit shown in FIG. 1. The oscillation circuit 10 includes a quartz crystal vibrator 100, an inverter 101, a control circuit 102, capacitors CP1 and CP2, and a resistor R1, as shown in FIG. 2. The capacitors CP1 and CP2 are respectively connected between the input and output terminals of the inverter 101 and a wiring line having reference potential VSS. The resistor R1 is connected to the output terminal and the input terminal of the inverter 101 and sandwiched therebetween.

The inverter 101 performs inversion amplification action, and the oscillation-source clock signal CL0 generated at the output terminal of the inverter 101 is fed back to the input terminal of the inverter 101 via the quartz crystal vibrator 100 and other components. In this process, the quartz crystal vibrator 100 vibrates in accordance with AC voltage applied by the inverter 101. The vibration is excited to vibration of large amplitude at a natural resonant frequency of the quartz crystal vibrator 100, so that the quartz crystal vibrator 100 acts as negative resistor. As a result, the oscillation circuit 10 oscillates at an oscillation frequency determined primarily by the resonant frequency of the quartz crystal vibrator 100.

It is, however, noted that the oscillation frequency of the oscillation circuit 10 can be finely adjusted by changing the capacitance of the capacitor CP1 or CP2. To this end, in the example shown in FIG. 2, the capacitor CP1 is formed, for example, of a plurality of capacitors and a switch circuit including a plurality of electronic switches connected to the respective capacitors.

The control circuit 102 receives as an input a control signal that controls the oscillation frequency of the oscillation circuit 10. The control circuit 102 includes, for example, a nonvolatile memory or any other memory and stores data for controlling the oscillation frequency of the oscillation circuit 10 in accordance with the control signal inputted to the control circuit 102 in the memory. The control circuit 102 further controls the switch circuit in such a way that the plurality of electronic switches are turned on or off on the basis of the data stored in the memory. The oscillation frequency of the oscillation circuit 10 can thus be externally controlled.

The oscillation circuit 10 shown in FIG. 1 is not necessarily a quartz crystal oscillation circuit and can instead be an oscillation circuit using a piezoelectric element, a SAW (surface acoustic wave) resonator, or a capacitance-type resonator. Still instead, the oscillation circuit 10 may be omitted, and an external circuit may supply the divider circuit 20 with the oscillation-source clock signal CL0.

The divider circuit 20 divides the oscillation-source clock signal CL0 to generate a divided clock signal CL1 having a frequency of 4096 Hz ($2^{12}$ Hz). The divided clock signal CL1 is supplied not only to the divider circuit but also to the low-order timing section 40 via the arbitration circuit 30. The divider circuit 21 divides the divided clock signal CL1 to generate a divided clock signal CL2 having an arbitrary frequency. The divided clock signal CL2 is supplied to another circuit that requires a clock signal.

Figure 3:
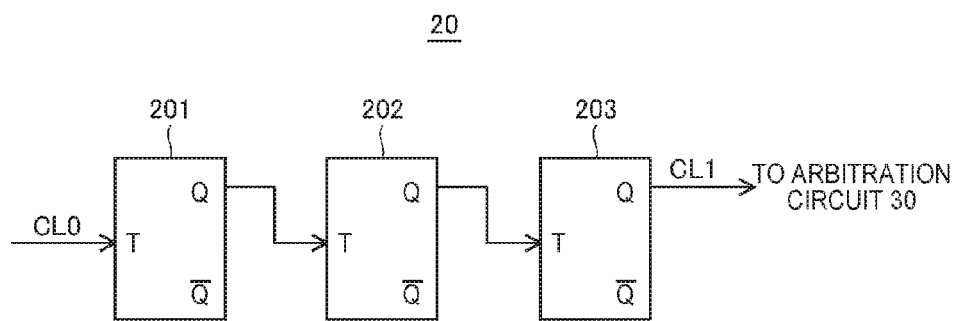
FIG. 3 is a circuit diagram showing an example of the configuration of each divided circuit shown in FIG. 1.

FIG. 3 is a circuit diagram showing an example of the configuration of each of the divided circuits shown in FIG. 1. The divider circuit 20 is formed, for example, of a plurality of T-type (toggle-type) flip-flops 201 to 203 connected in series to each other as shown in FIG. 3. Each of the T-type flip-flops outputs an inverted signal whenever a signal inputted to the input terminal T undergoes one cyclic period to divide the signal inputted to the input terminal T by 2.

The divider circuit 20 thus divides the oscillation-source clock signal CL0 having a frequency of 32768 Hz ($2^{15}$ Hz) by $2^3$ to generate the divided clock signal CL1 having a frequency of 4096 Hz ($2^{12}$ Hz). FIG. 3 shows an example of the configuration of the divider circuit 20 by way of example, and the divider circuit 21 may be configured in the same manner. It is, however, noted that an arbitrary number of T-type flip-flops may be connected in series to each other.

Referring back to FIG. 1, the low-order timing section 40 performs timing action in synchronization with the divided clock signal CL1 to generate timed data T0 representing time on a 1/1000-second basis and timed data T1 representing time on a 1/100-second basis. The high-order timing section 50 performs timing action in synchronization with a carry signal CA2 outputted from the low-order timing section 40 to generate, for example, timed data T2 representing time on a second basis to timed data T8 representing time on a year basis.

The host interface 60 communicates with an external host CPU, externally receives a command, and uses the command to control each portion of the timing device. The host interface 60 is formed, for example, of a digital circuit and an analog circuit. In a case where serial communication is performed between the host interface 60 and the host CPU, a serial bus that complies with the SPI standard, the I2C standard, or any other suitable standard can be used.

To set an initial state, the host interface 60 receives a write command with a specified address from the host CPU along with a count initial value or initial value data and sets the count initial value or the initial value data in the low-order timing section 40 and the high-order timing section 50 in accordance with the received write command.

On the other hand, to read timed data, the host interface 60 receives a read command with a specified address and activates one of read enable signals E0 to E8 in accordance with the received read command. When one of the read enable signals E0 to E8 is activated, the low-order timing section 40 or the high-order timing section 50 outputs one of the timed data T0 to T8 to the host interface 60. The host interface 60 may instead sequentially activate the read enable signals E0 to E8.

The host interface 60 thus reads the timed data T0 to T8 from the low-order timing section 40 and the high-order timing section 50. Similarly, the host interface 60 can read the timed data T0 to T8 from the timed data storage 80. The host interface 60 transmits the timed data read from the low-order timing section 40 and the high-order timing section 50 or the timed data storage 80 to the host CPU.

To avoid a situation in which timed data do not change in a period for which the timed data are read from the low-order timing section 40 and the high-order timing section 50, the arbitration circuit 30 delays pulses contained in the divided clock signal CL1 in the period for which the timed data are read. In the other periods, the arbitration circuit 30 directly outputs the divided clock signal CL1 supplied from the divider circuit 20. The arbitration circuit 30 is formed, for example, of a logic circuit including a combinatorial circuit or a sequential circuit.

Figure 4:
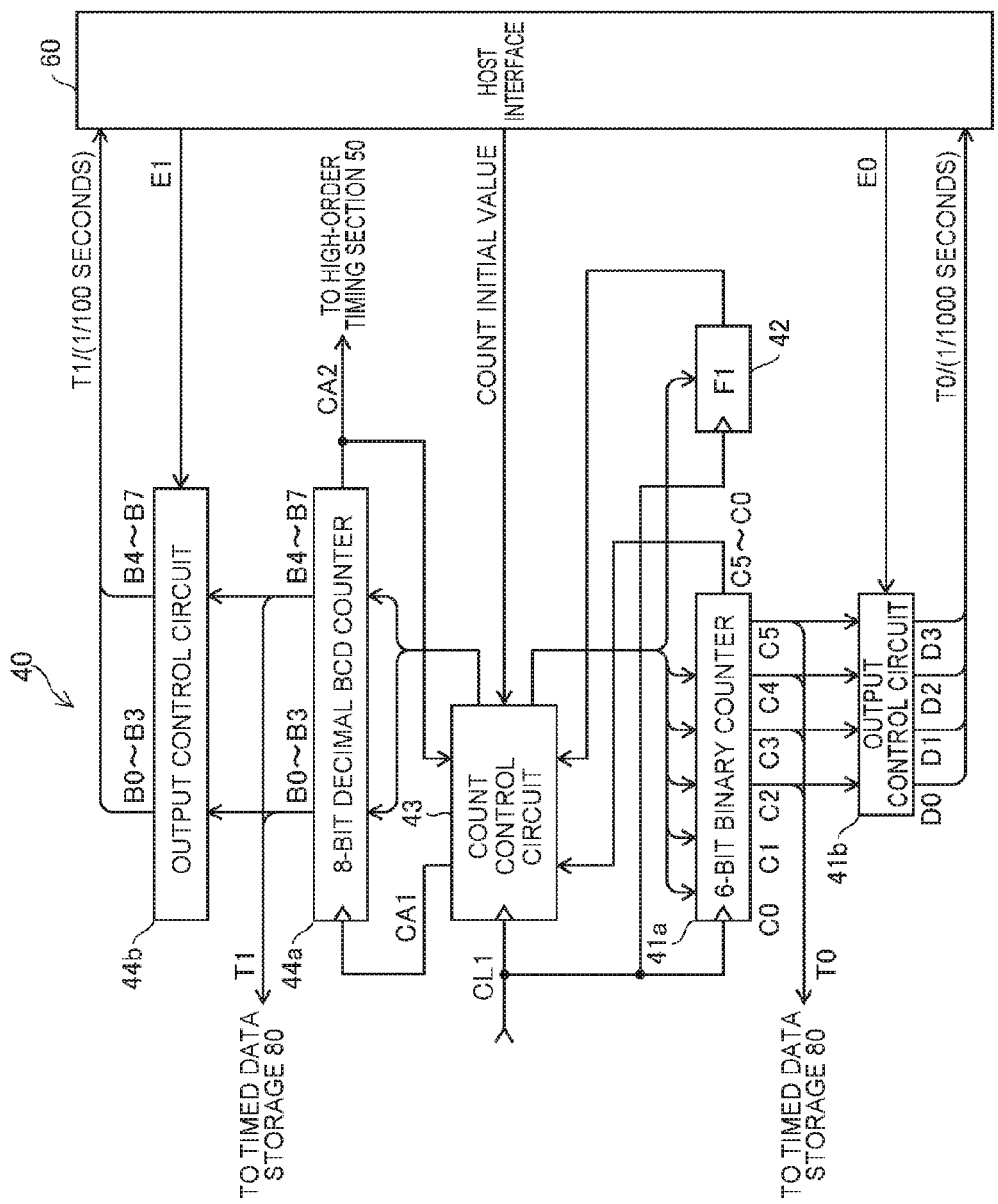
FIG. 4 shows an example of the configuration of a low-order timing section shown in FIG. 1 along with a host interface.

FIG. 4 shows an example of the configuration of the low-order timing section shown in FIG. 1 along with the host interface. The low-order timing section 40 includes a first counter 41a, an output control circuit 41b, a count control data storage 42, a count control circuit 43, a second counter 44a, and an output control circuit 44b, as shown in FIG. 4.

The first counter 41a is formed, for example, of a 6-bit binary counter. To perform timing action on a 1/100-second basis, the first counter 41a performs counting action in synchronization with the pulses in the divided clock signal CL1, which has the frequency of 4096 Hz, to generate a 6-bit count value formed of C5 to C0 representing a decimal number from "0" to "39" in each count cycle. C5 represents the most significant bit, and C0 represents the least significant bit.

The output control circuit 41b is formed, for example, of a plurality of transmission gates. When the read enable signal E0 is activated, the output control circuit 41b outputs the upper 4 bits C5 to C2 of the count value generated by the first counter 41a as 4-bit timed data T0 representing the time on a 1/1000-second basis to the host interface 60 via a read data bus. The timed data T0 is formed of 4 bits D3 to D0 corresponding to the upper 4 bits C5 to C2 of the count value.

Since one cyclic period of the divided clock signal CL1 is about 244 μsec, the timed data T0 representing the time on a 1/1000-second basis is generated by shifting the upper 4 bits C5 to C2 of the count value of the first counter 41a by 2 bits toward lower levels and dividing the shifted count value by 4. It is, however, noted that four cyclic periods of the divided clock signal CL1 contain an error of about −23.4 μsec per 1/1000 seconds.

According to the present embodiment, shifting the upper 4 bits "0000" to "1001" of 6-bit count values "000000" to "100111" generated for performing the timing action on a 1/100-second basis by 2 bits toward lower levels allows generation of the 4-bit timed data T0 representing decimal numbers "0" to "9" as time on a 1/1000-second basis in a simple circuit configuration with almost no increase in consumed current.

The counting action performed by the first counter 41a includes a 40-count cycle in which the count value sequentially changes from "0" to "39" and then returns to "0" and a 41-count cycle in which the count value successively experiences "39" twice and then returns to "0". In view of the counting action, the low-order timing section 40 is provided with the count control data storage 42, which stores 1-bit count control data (flag) F1 representing information on the 40-th count. The count control data storage 42 is formed, for example, of a D-type flip-flop.

When the initial state is set, the count control circuit 43 sets the count initial value supplied via the host interface 60 in the first counter 41a and the second counter 44a and resets the count control data F1 stored in the count control data storage 42 to "0". The count control circuit 43 is formed, for example, of a state machine including a sequence circuit.

The count value formed of C5 to C0 generated by the first counter 41a is also supplied to the count control circuit 43. In a case where the count cycle has reached a predetermined number, when the count value generated by the first counter 41a is equal to the value representing the decimal number "39", the count control circuit 43 sets the count control data F1 at "1". The count control circuit 43 thus sets a first state transition in which the count value remains unchanged even when the next pulse in the divided clock signal CL1 arrives and the count value is reset to "0" in synchronization with the next pulse but one in the divided clock signal CL1.

On the other hand, in a case where the count cycle has not reached the predetermined number, the count control circuit 43 maintains the count control data F1 at "0" even when the count value generated by the first counter 41a is equal to the value representing the decimal number "39". The count control circuit 43 thus sets a second state transition in which the count value is reset to "0" in synchronization with the next pulse in the divided clock signal CL1.

According to the configuration described above, the period of each count cycle can be adjusted with the count value generated by the first counter 41a being smaller than or equal to "100111". In the case where the divided clock signal CL1 has a frequency of 4096 Hz ($2^{12}$ Hz), the count control circuit 43 sets the first state transition 96 times and sets the second state transition 4 times in consecutive 100 count cycles and outputs a carry signal CA1 whenever each of the count cycles ends. The carry signal CA1 outputted from the count control circuit 43 can then be used in the timing action on a 1/100-second basis.

In each of the 41-count cycles, the period of one count cycle corresponds to 41 cyclic periods of the divided clock signal CL1 or is equal to about 10.01 msec. On the other hand, in each of the 40-count cycles, the period of one count cycle corresponds to 40 cyclic periods of the divided clock signal CL1 or is equal to about 9.77 msec. Setting the 41-count cycles and the 40-count cycles in an appropriate sequence therefore allows reduction in an error in the time expressed by timed data.

For example, out of the consecutive 100 cycles, in the cycles other than the 13th, 38th, 63rd, and 88th cycles, when the count value generated by the first counter 41a is equal to the value representing the decimal number "39", the count control circuit 43 sets the first state transition by setting the count control data F1 at "1".

In the first state transition, the count control circuit 43 causes the first counter 41a to stop the counting action and resets, in synchronization with the next pulse in the divided clock signal CL1, the count control data F1 to "0". The count control circuit 43 further causes the first counter 41a to resume the counting action, resets the count value to "0", and outputs the carry signal CA1 in synchronization with the next pulse but one in the divided clock signal CL1. The 41-count cycle is thus achieved.

On the other hand, out of the consecutive 100 cycles, in the 13th, 38th, 63rd, and 88th cycles, when the count value generated by the first counter 41a is equal to the value representing the decimal number "39", the count control circuit 43 sets the second state transition by maintaining the count control data F1 at "0".

In the second state transition, the count control circuit 43 resets the count value of the first counter 41a to "0" and outputs the carry signal CA1 in synchronization with the next pulse in the divided clock signal CL1. The 40-count cycle is thus achieved. Errors in the 41-count cycles and the 40-count cycles thus decrease, whereby an error in the time expressed by timed data can be reduced.

The carry signal CA1 outputted from the count control circuit 43 is supplied to the second counter 44a. The second counter 44a performs counting action in synchronization with the carry signal CA1 outputted from the count control circuit to generate count values representing the time on a 1/100-second basis and outputs the carry signal CA2 when the count value transitions to "0".

The second counter 44a is formed, for example, of an 8-bit decimal BCD (binary coded decimal) counter. A BCD count value generated by the second counter 44a contains 4 bits B0 to B3 representing the 1/100-second place of a decimal number and 4 bits B4 to B7 representing the 1/10-second place of the decimal number.

The second counter 44a successively generates count values representing the decimal numbers "0" to "99" in synchronization with the pulses in the carry signal CA1. When the current count value is equal to the value representing the decimal number "99", the second counter 44a resets the count value to "0" and outputs the carry signal CA2 in synchronization with the next pulse in the carry signal CA1.

The period required for the second counter 44a to perform counting action 100 times is one second, as shown by the following equation.

$$4096^{-1} \times (41 \times 96 + 40 \times 4) = 1$$

The carry signal CA2 therefore has a frequency of 1 Hz. Further, the period required for the second counter 44a to perform counting action once contains an error of about ±117 μsec at the maximum but accurately corresponds to the period of 1/100 seconds in the long run.

The count value generated by the second counter 44a is used as the timed data T1 representing the time on a 1/100-second basis. When the read enable signal E1 is activated, the output control circuit 44b, which is formed, for example, of a plurality of transmission gates, outputs the timed data T1 generated by the second counter 44a to the host interface 60 via the read data bus.

Figure 5:
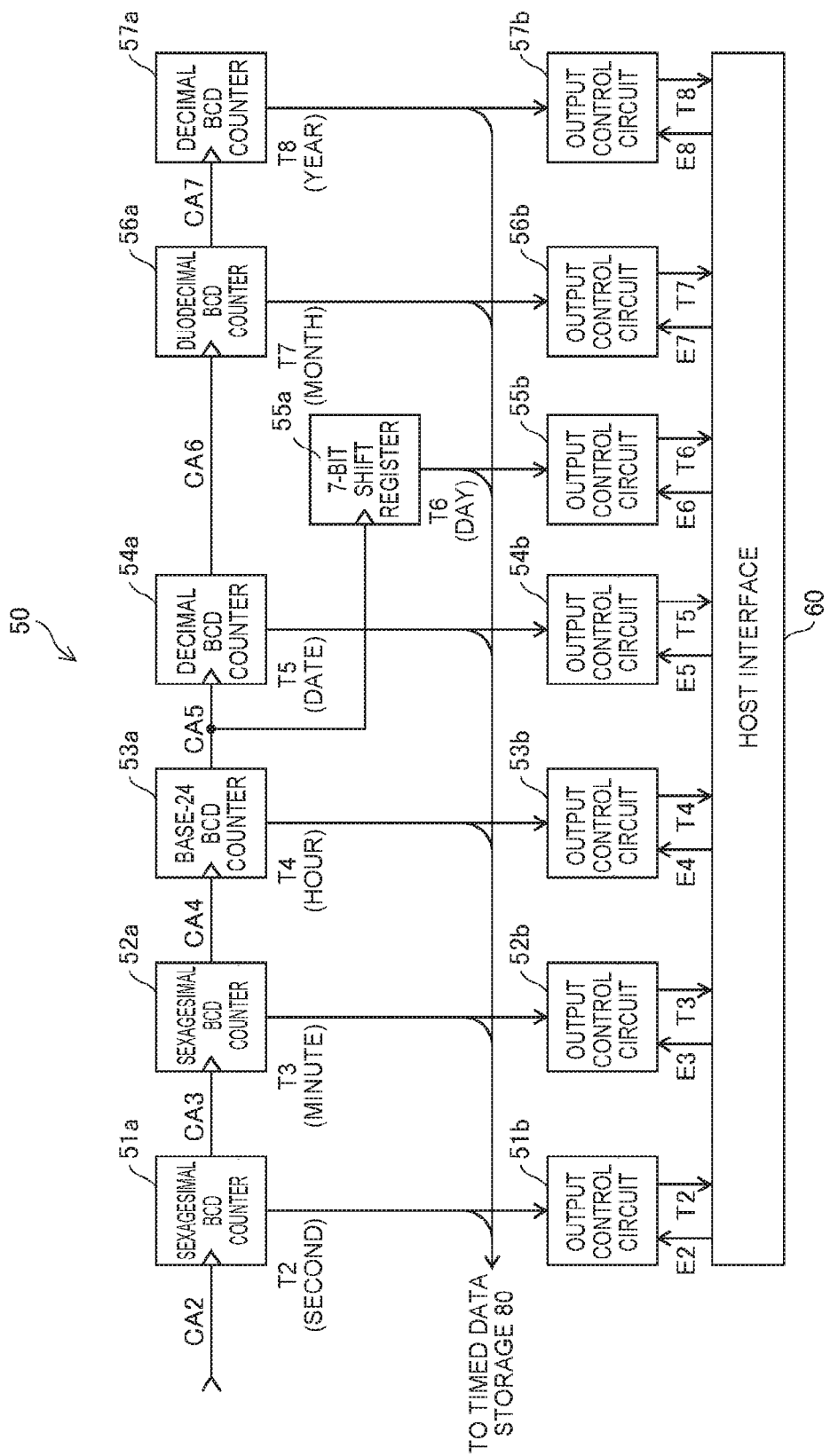
FIG. 5 shows an example of the configuration of a high-order timing section shown in FIG. 1 along with the host interface.

FIG. 5 shows an example of the configuration of the high-order timing section shown in FIG. 1 along with the host interface. In the first embodiment, the high-order timing section 50 includes a plurality of high-order counter 51a and other high-order counters, which perform counting action in synchronization with the carry signal CA2 to generate a plurality of count values each representing time longer than or equal to the second.

For example, the high-order timing section 50 includes a third counter 51a to a sixth counter 54a, a day data generator 55a, a seventh counter 56a and an eight counter 57a, and output control circuits 51b to 57b, as shown in FIG. 5. Each of the output control circuits 51b to 57b is formed, for example, of a plurality of transmission gates.

The third counter 51a performs counting action in synchronization with the carry signal CA2 to generate count values representing the time on a second basis. The third counter 51a is formed, for example, of a sexagesimal BCD counter and successively generates BCD count values representing decimal numbers "0" to "59" in synchronization with the pulses in the carry signal CA2. When the current count value is equal to the value representing the decimal number "59", the third counter 51a resets the count value to "0" and outputs a carry signal CA3 in synchronization with the next pulse in the carry signal CA2.

The count values generated by the third counter 51a are used as the timed data T2 representing the time on a second basis. When the read enable signal E2 is activated, the output control circuit 51b outputs the timed data T2 generated by the third counter 51a to the host interface 60 via the read data bus.

The fourth counter 52a performs counting action in synchronization with the carry signal CA3 to generate count values representing the time on a minute basis. The fourth counter 52a is formed, for example, of a sexagesimal BCD counter and successively generates BCD count values representing decimal numbers "0" to "59" in synchronization with the pulses in the carry signal CA3. When the current count value is equal to the value representing the decimal number "59", the fourth counter 52a resets the count value to "0" and outputs a carry signal CA4 in synchronization with the next pulse in the carry signal CA3.

The count values generated by the fourth counter 52a are used as timed data T3 representing the time on a minute basis. When the read enable signal E3 is activated, the output control circuit 52b outputs the timed data T3 generated by the fourth counter 52a to the host interface 60 via the read data bus.

The fifth counter 53a performs counting action in synchronization with the carry signal CA4 to generate count values representing the time on an hour basis. The fifth counter 53a is formed, for example, of a base-24 BCD counter and successively generates BCD count values representing decimal numbers "0" to "23" in synchronization with the pulses in the carry signal CA4. When the current count value is equal to the value representing the decimal number "23", the fifth counter 53a resets the count value to "0" and outputs a carry signal CA5 in synchronization with the next pulse in the carry signal CA4.

The count values generated by the fifth counter 53a are used as timed data T4 representing the time on an hour basis. When the read enable signal E4 is activated, the output control circuit 5b outputs timed data T4 generated by the fifth counter 53a to the host interface 60 via the read data bus.

The sixth counter 54a performs counting action in synchronization with the carry signal CA5 to generate count values representing the time on a date basis. The sixth counter 54a is formed, for example, of a decimal BCD counter and successively generates BCD count values representing decimal numbers "1" to "31" in synchronization with the pulses in the carry signal CA5.

It is, however, noted that in a specific month, the last date of the month needs to be "28" or "30", and in February in a leap year, the last date of the month needs to be "29". To this end, the six counter 54a compares each of the count values representing the time on a date basis with a count upper limit set on the basis of count values representing the time on a month basis and count values representing the time on a year basis. When any of the count values is equal to the count upper limit, the six counter 54a resets the count value to "1" and outputs a carry signal CA6 in synchronization with the next pulse in the carry signal CA5.

The count values generated by the sixth counter 54a are used as timed data T5 representing the time on a date basis. When the read enable signal E5 is activated, the output control circuit 54b outputs the timed data T5 generated by the sixth counter 54a to the host interface 60 via the read data bus.

The day data generator 55a generates the timed data T6 representing the day of the week in synchronization with the carry signal CA5. The day data generator 55a is formed, for example, of a 7-bit shift register including 7 D-type flip-flops connected to each other in a ring shape. The seven flip-flops correspond to the seven days of the week, from Sunday to Saturday.

When the initial state is set, the host interface 60 sets data in one of the flip-flops at "1" and resets data in the other flip-flops to "0" in accordance with the 7-bit initial value data supplied from the host CPU. The shift registers then shift the day data in one direction in synchronization with the carry signal CA5. The current day is expressed in the form of the position of the data "1" in the seven flip-flops of the shift registers.

The day data generated by the day data generator 55a are used as timed data T6 representing the day of the week. When the read enable signal E6 is activated, the output control circuit 55b outputs the timed data T6 generated by the day data generator 55a to the host interface 60 via the read data bus.

The seventh counter 56a performs counting action in synchronization with the carry signal CA6 to generate count values representing the time on a month basis. The seventh counter 56a is formed, for example, of a duodecimal BCD counter and successively generates BCD count values representing decimal numbers "1" to "12" in synchronization with the pulses in the carry signal CA6. When the current count value is equal to the value representing the decimal number "12", the seventh counter 56a resets the count value to "1" and outputs a carry signal CA7 in synchronization with the next pulse in the carry signal CA6.

The count values generated by the seventh counter 56a are used as timed data T7 representing the time on a month basis. When the read enable signal E7 is activated, the output control circuit 56b outputs the timed data T7 generated by the seventh counter 56a to the host interface 60 via the read data bus.

The eighth counter 57a performs counting action in synchronization with the carry signal CA7 to generate count values representing the time on a year basis. The eighth counter 57a is formed, for example, of a decimal BCD counter and successively generates BCD count values representing the lower two digits of the decimal numbers "2015," "2016," "2017," . . . in the case of the Christian Era calendar in synchronization with the pulses in the carry signal CA7.

The count values generated by the eighth counter 57a are used as the timed data T8 representing the time on a year basis. When the read enable signal E8 is activated, the output control circuit 57b outputs the timed data T8 generated by the eighth counter 57a to the host interface 60 via the read data bus.

Referring back to FIG. 1, an event detection signal activated when an event is detected is externally supplied to an input terminal P1. The event corresponds, for example, to action of pushing a stop button of a stopwatch, action of operating a power meter, and action of opening an electric lock.

The time stamp circuit 70 stores at least the timed data T0 representing the time on a $1/1000$-second basis along with necessary one(s) of the timed data T1 representing the time on a $1/100$-second basis to the timed data T8 representing the time on a year basis in the timed data storage 80 in response to the event detection signal supplied to the input terminal P1. The timing device can thus record the time when the event is detected on a $1/1000$-second basis. The time stamp circuit 70 is formed, for example, of a logic circuit including a combinatorial circuit or a sequential circuit, and the timed data storage 80 is formed, for example, of any of a variety of memories or registers.

According to the first embodiment, the cycles of the counting action performed by the first counter 41a and the second counter 44a shown in FIG. 4 always match the cycles of the counting action performed by the high-order counter 51a and the other high-order counters shown in FIG. 5. Therefore, when the time on a second basis transitions to "0", the time on a $1/100$-second basis and the time on a $1/1000$-second basis also transition to "0", whereby the timing of the counting action performed by the first counter 41a and the second counter 44a does not need to be arbitrated with the timing of the counting action performed by the high-order counter 51a and the other high-order counters.

Second Embodiment

Figure 6:
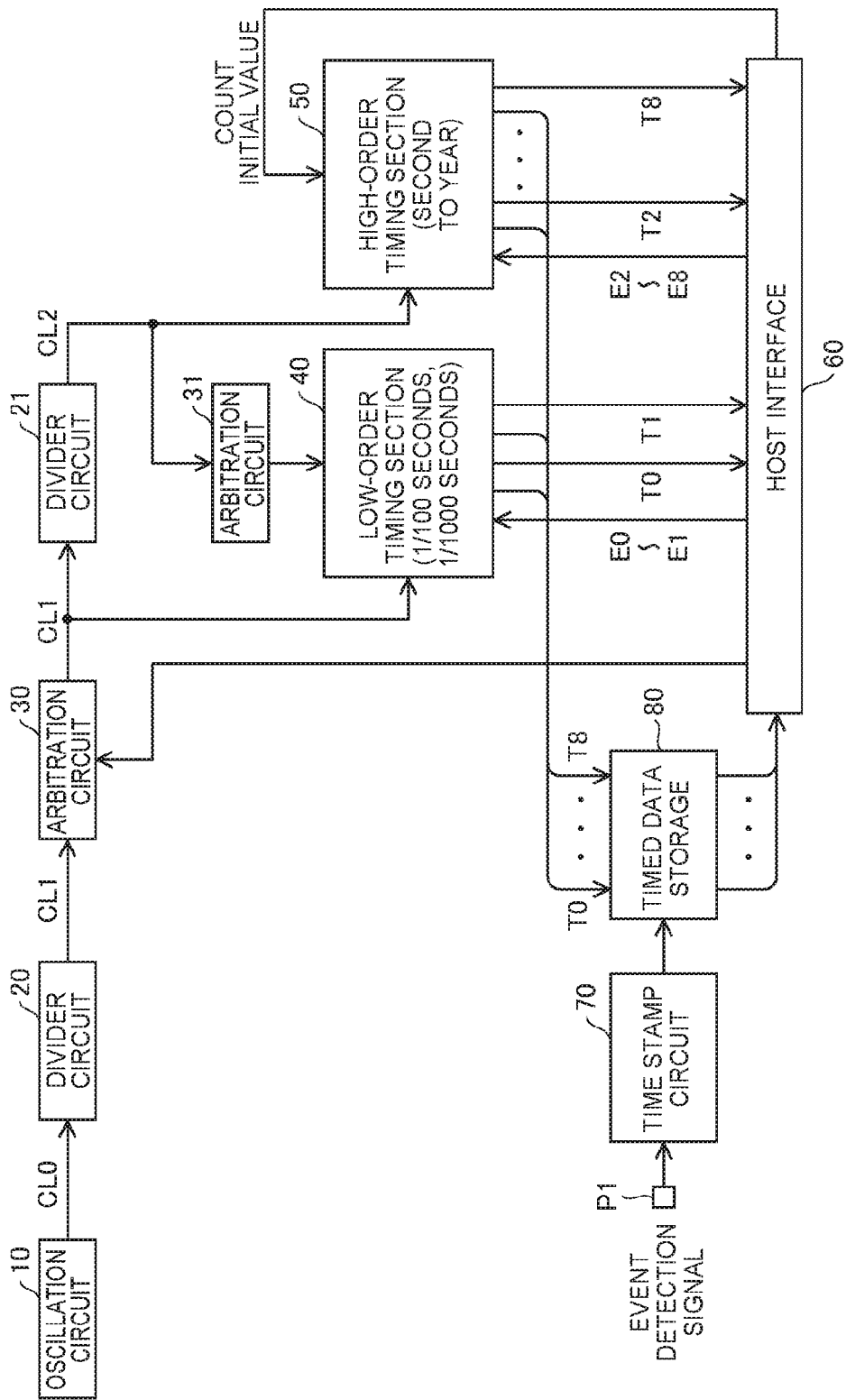
FIG. 6 is a block diagram showing an example of the configuration of a timing device according to a second embodiment of the invention.

FIG. 6 is a block diagram showing an example of the configuration of a timing device according to a second embodiment of the invention. In the second embodiment, the divider circuit 21 divides the divided clock signal CL1 outputted from the arbitration circuit 30 to generate the divided clock signal CL2 having a frequency of 1 Hz, and the high-order timing section 50 performs timing action in synchronization with the divided clock signal CL2. Further, an arbitration circuit 31 is added to the first embodiment, as shown in FIG. 6. With regard to the other points, the second embodiment may be the same as the first embodiment.

The oscillation circuit 10 performs oscillation action to generate the oscillation-source clock signal CL0, for example, having the frequency of 32768 Hz. The divider circuit 20 divides the oscillation-source clock signal CL0 to generate the divided clock signal CL1 having the frequency of 4096 Hz. The divider circuit 21 divides the divided clock signal CL1 to generate the divided clock signal CL2 having the frequency of 1 Hz. The divider circuit 21 is formed, for example, of 12 T-type flip-flops, such as those shown in FIG. 3, in series.

In the second embodiment, the high-order timing section 50 includes the plurality of high-order counter 51a and other high-order counters (FIG. 5), which perform counting action in synchronization with the divided clock signal CL2 to generate the plurality of count values each representing time longer than or equal to the second. That is, the third counter 51a performs counting action in synchronization with the divided clock signal CL2 to generate count values representing the time on a second basis.

The arbitration circuit 31 forcibly resets the first counter 41a and the second counter 44a (FIG. 4) of the low-order timing section 40 in synchronization with the divided clock signal CL2 in such a way that the timed data T2 to T8 each representing time longer than or equal to the second do not contradict the timed data T1 representing the time on a $1/100$-second basis and the timed data T0 representing the time on a $1/1000$-second basis when the high-order timing section 50 updates the timed data. The arbitration circuit 31 is formed, for example, of a logic circuit including a combinatorial circuit or a sequential circuit.

According to the second embodiment, since the circuit configuration for generating the divided clock signal CL2 to generate a plurality of count values each representing time longer than or equal to the second is as simple as the configuration of a timing device of related art that performs timing action on a second basis and on a longer time unit basis, the compatibility in terms of circuit layout and other factors with a timing device of related art can be enhanced.

Electronic Apparatus

An embodiment of an electronic apparatus using the timing device according to any of the embodiments of the invention will next be described.

Figure 7:
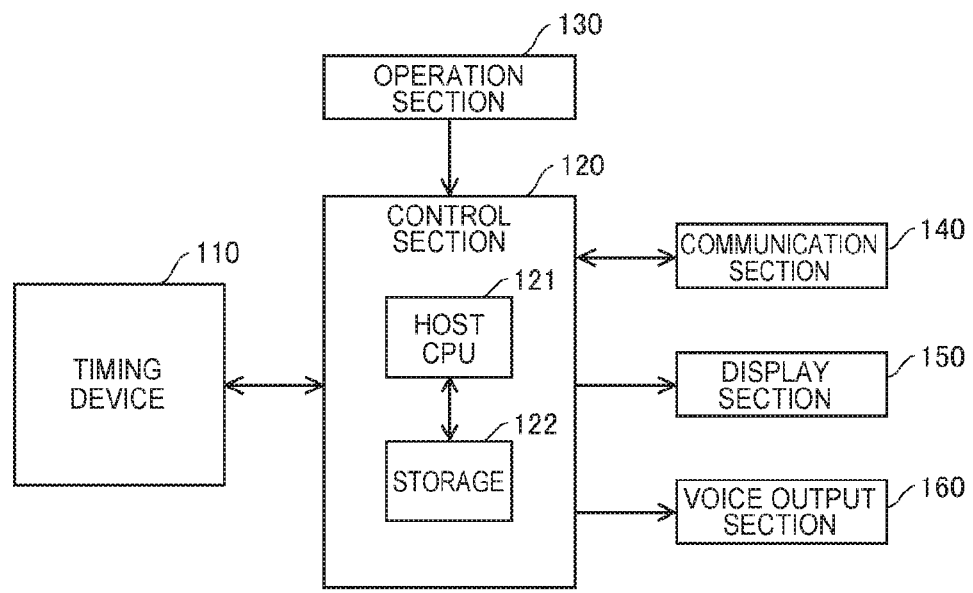
FIG. 7 is a block diagram showing an example of the configuration of an electronic apparatus according to an embodiment of the invention.

FIG. 7 is a block diagram showing an example of the configuration of an electronic apparatus according to an embodiment of the invention. The electronic apparatus includes a timing device 110 according to any of the embodiments of the invention, a control section 120, an operation section 130, a communication section 140, a display section 150, and a voice output section 160, as shown in FIG. 7. It is noted that part of the components shown in FIG. 7 may be omitted or changed, or another component may be added to the components shown in FIG. 7.

The control section 120 includes a host CPU (central processing unit) 121 and a storage 122. The host CPU 121 operates on the basis of software (such as timing program) recorded on a recording medium in the storage 122. The recording medium can, for example, be a hard disk drive, a flexible disk drive, an MO, an MT, a variety of memories, a CD-ROM, or a DVD-ROM.

The host CPU 121 transmits a write command and a count initial value or initial value data to the timing device 110 when an initial state is set to set the initial state in the timing device 110. The host CPU 121 further transmits a read command to the timing device 110 to read the current time and event detection time from the timing device 110.

The control section 120 generates display signals representing the current time and the event detection time and generates a voice signal for issuing a message in a case where an event is detected on the basis of timed data transmitted from the timing device 110. The control section 120 further, for example, outputs a log file containing time stamp data representing the time when an electronic lock is released and causes the display section 150 to display the time when the electronic lock is opened.

The operation section 130 is an input device including, for example, operation keys and button switches and outputs an operation signal according to a user's operation to the host CPU 121. The user can operate the operation section 130 to set the current time, alarm time, or timer time. The communication section 140 is formed, for example, of an analog circuit and a digital circuit and performs data communication between the host CPU 121 and an external apparatus.

The display section 150 includes, for example, an LCD (liquid display device) and displays the current time and event detection time on the basis of the display signals supplied from the host CPU 121. The voice output section 160 includes, for example, a loudspeaker and issues a message on the basis of the voice signal supplied from the host CPU 121.

The electronic apparatus described above corresponds, for example, to a stopwatch, a wristwatch, a clock, and other timepieces, a timer, a sequencer, a power meter, an electric lock, a portable phone and other mobile terminals, a digital still camera, a digital camcorder, a television, a TV phone, a security monitor, a head mounted display, a personal computer, a printer, a network apparatus, a multifunction machine, an in-vehicle apparatus (such as navigator), a desktop calculator, an electronic dictionary, an electronic game console, a robot, a measuring apparatus, and medical apparatus (for example, electronic thermometer, blood pressure gauge, blood sugar meter, electrocardiograph, ultrasonic diagnostic apparatus, and electronic endoscope).

According to the present embodiment, the timing device 110, which generates timed data representing the time on a $1/1000$-second basis in a simple circuit configuration with almost no increase in consumed current, can be used to provide an electronic apparatus capable of displaying the time on a $1/1000$-second basis or recording event detection time on a $1/1000$-second basis.

Moving Object

An embodiment of a moving object using the timing device according to any of the embodiments of the invention will next be described. The moving object corresponds, for example, to an automobile, a self-propelling robot, a self-propelling transport apparatus, a train, a ship, an airplane, and an artificial satellite.

Figure 8:
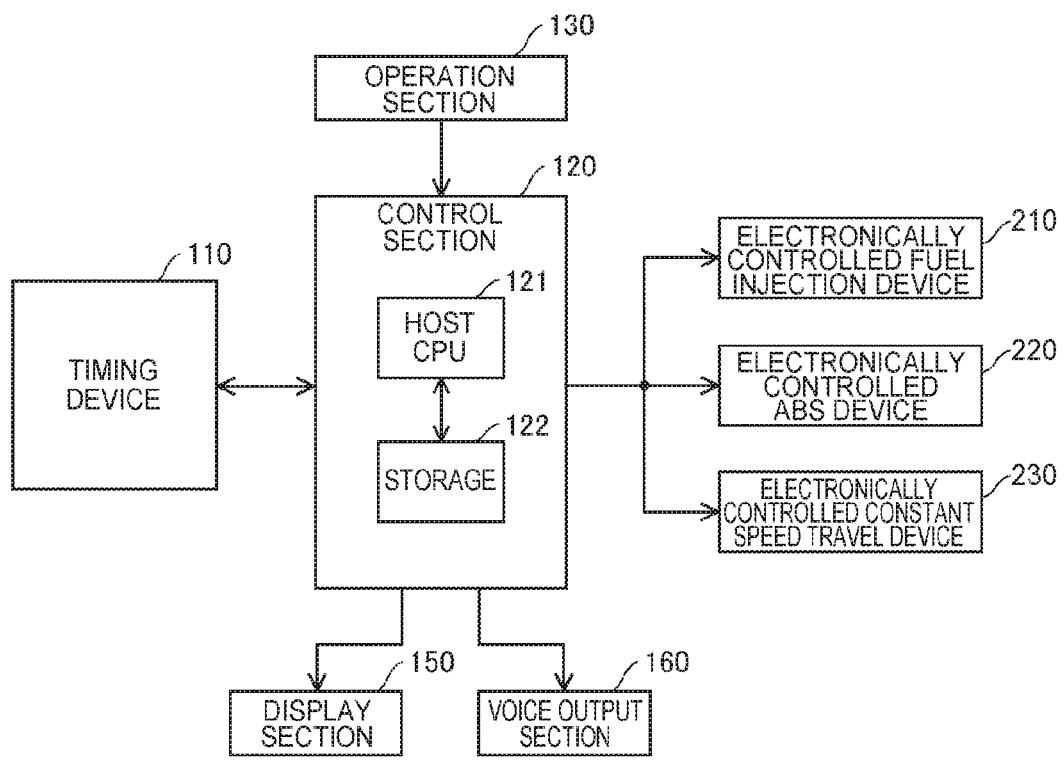
FIG. 8 is a block diagram showing an example of the configuration of a moving object according to an embodiment of the invention.

FIG. 8 is a block diagram showing an example of the configuration of a moving object according to an embodiment of the invention. The moving object includes the timing device 110 according to any of the embodiments of the invention, the control section 120, the operation section 130, the display section 150, and the voice output section 160 and further incorporates an electronically controlled fuel injection device 210, an electronically controlled ABS device 220, an electronically controlled constant speed travel device 230, and a variety of other electronically controlled devices, as shown in FIG. 8. It is noted that part of the components shown in FIG. 8 may be omitted or changed, or another component may be added to the components shown in FIG. 8.

The timing device 110, for example, transmits timed data to the host CPU 121 of the control section 120 in accordance with a read command from the host CPU 121. The control section 120 generates display signals representing the current time and event detection time and a voice signal for issuing a message in a case where an event is detected on the basis of the timed data transmitted from the timing device 110. As a result, the display section 150 displays the current time and event detection time on the basis of the display signals, and the voice output section 160 issues a message on the basis of the voice signal.

The timing device 110 further supplies a clock signal generated by the oscillation circuit 10 and the divider circuit 20 or the divider circuit 21 shown in FIG. 1 or 6 via the control section 120 to the electronically controlled fuel injection device 210, the electronically controlled ABS device 220, the electronically controlled constant speed travel device 230, or any other device.

For example, the electronically controlled fuel injection device 210 acts in synchronization with the clock signal supplied from the timing device 110 and injects a liquid fuel in the form of mist into sucked air at predetermined timing in a gasoline engine or any other premixture combustion engine. The electronically controlled ABS (antilock brake system) device 220 acts in synchronization with the clock signal supplied from the timing device 110 and repeats the following operation: The device drives the brake in a gradually intensive manner when braking operation is performed; temporarily releasing the brake when the moving object starts skidding; and driving the brake again. The electronically controlled constant speed travel device 230 acts in synchronization with the clock signal supplied from the timing device 110 and controls the accelerator, the brake, or any other component in such a way that the moving object moves at a constant speed while monitoring the speed of the moving object.

According to the present embodiment, the timing device 110, which generates timed data representing the time on a $\frac{1}{1000}$-second basis in a simple circuit configuration with almost no increase in consumed current, can be used to provide a moving object capable of displaying the time on a $\frac{1}{1000}$-second basis or recording event detection time on a $\frac{1}{1000}$-second basis. The invention is not limited to the embodiments described above, and a person skilled in the art can conceive of a large number of variations within the technical idea of the invention.

The entire disclosure of Japanese Patent Application No. 2015-232819, filed Nov. 30, 2015 is expressly incorporated by reference herein.

What is claimed is:

1. A timing device comprising:
   a counter that performs counting action in synchronization with pulses in a clock signal to generate a 6-bit count value representing decimal numbers "0" to "39" in each count cycle in order to perform counting action on a $\frac{1}{100}$-second basis; and
   an output control circuit that outputs upper 4 bits of the count value generated by the counter as 4-bit timed data representing time on a $\frac{1}{1000}$-second basis.

2. The timing device according to claim 1, further comprising a count control circuit that acts when the count value generated by the counter is equal to a value representing a decimal number "39" and sets one of (i) a first state transition in which the count value is maintained even when a next pulse in the clock signal arrives and the count value is reset to "0" in synchronization with a next pulse but one in the clock signal and (ii) a second state transition in which the count value is reset to "0" in synchronization with the next pulse in the clock signal.

3. The timing device according to claim 2, wherein the clock signal has a frequency of $2^{12}$ Hz, and the count control circuit sets the first state transition 96 times and sets the second state transition 4 times in consecutive 100 count cycles and outputs a carry signal when each of the count cycles ends.

4. The timing device according to claim 3, further comprising:
   a second counter that performs counting action in synchronization with a carry signal outputted from the count control circuit to generate a count value representing time on a $\frac{1}{100}$-second basis and outputs a second carry signal when the count value transitions to "0"; and
   a plurality of high-order counters that perform counting action in synchronization with the second carry signal to generate a plurality of count values each representing time longer than or equal to a second.

5. The timing device according to claim 4, further comprising a time stamp circuit that stores at least timed data representing time on a $\frac{1}{1000}$-second basis in a timed data storage in response to an event detection signal.

6. The timing device according to claim 3, further comprising:
   a second counter that performs counting action in synchronization with a carry signal outputted from the count control circuit to generate a count value representing time on a $\frac{1}{100}$-second basis;
   a divider circuit that divides the clock signal to generate a divided clock a signal;
   a plurality of high-order counters that perform counting action in synchronization with the divided clock signal to generate a plurality of count values each representing time longer than or equal to a second; and
   an arbitration circuit that resets the counter and the second counter in synchronization with the divided clock signal.

7. The timing device according to claim 6, further comprising a time stamp circuit that stores at least timed data representing time on a $\frac{1}{1000}$-second basis in a timed data storage in response to an event detection signal.

8. The timing device according to claim 3, further comprising a time stamp circuit that stores at least timed data representing time on a $\frac{1}{1000}$-second basis in a timed data storage in response to an event detection signal.

9. The timing device according to claim 2, further comprising:
   a second counter that performs counting action in synchronization with a carry signal outputted from the count control circuit to generate a count value representing time on a $\frac{1}{100}$-second basis and outputs a second carry signal when the count value transitions to "0"; and
   a plurality of high-order counters that perform counting action in synchronization with the second carry signal to generate a plurality of count values each representing time longer than or equal to a second.

10. The timing device according to claim 9, further comprising a time stamp circuit that stores at least timed data representing time on a $\frac{1}{1000}$-second basis in a timed data storage in response to an event detection signal.

11. The timing device according to claim 2, further comprising:
    a second counter that performs counting action in synchronization with a carry signal outputted from the count control circuit to generate a count value representing time on a $\frac{1}{100}$-second basis;
    a divider circuit that divides the clock signal to generate a divided clock a signal;

a plurality of high-order counters that perform counting action in synchronization with the divided clock signal to generate a plurality of count values each representing time longer than or equal to a second; and an arbitration circuit that resets the counter and the second counter in synchronization with the divided clock signal.

12. The timing device according to claim 11, further comprising a time stamp circuit that stores at least timed data representing time on a $1/1000$-second basis in a timed data storage in response to an event detection signal.

13. The timing device according to claim 2, further comprising a time stamp circuit that stores at least timed data representing time on a $1/1000$-second basis in a timed data storage in response to an event detection signal.

14. An electronic apparatus comprising the timing device according to claim 2.

15. A moving object comprising the timing device according to claim 2.

16. The timing device according to claim 1, further comprising a time stamp circuit that stores at least timed data representing time on a $1/1000$-second basis in a timed data storage in response to an event detection signal.

17. An electronic apparatus comprising the timing device according to claim 16.

18. A moving object comprising the timing device according to claim 16.

19. An electronic apparatus comprising the timing device according to claim 1.

20. A moving object comprising the timing device according to claim 1.

* * * * *